United States Patent
Ebana et al.

(10) Patent No.: US 9,416,249 B2
(45) Date of Patent: Aug. 16, 2016

(54) ANTI-ADHESIVE AGENT FOR ASPHALT MIXTURES

(71) Applicant: NOF CORPORATION, Shibuya-ku, Tokyo (JP)

(72) Inventors: Hiroatsu Ebana, Amagasaki (JP); Motonari Mizuta, Amagasaki (JP)

(73) Assignee: NOF CORPORATION, Tokyo (JP)

( * ) Notice: Subject to any disclaimer, the term of this patent is extended or adjusted under 35 U.S.C. 154(b) by 0 days.

(21) Appl. No.: 14/419,816

(22) PCT Filed: Aug. 2, 2013

(86) PCT No.: PCT/JP2013/071034
§ 371 (c)(1),
(2) Date: Feb. 5, 2015

(87) PCT Pub. No.: WO2014/024801
PCT Pub. Date: Feb. 13, 2014

(65) Prior Publication Data
US 2015/0225535 A1 Aug. 13, 2015

(30) Foreign Application Priority Data

Aug. 10, 2012 (JP) ................. 2012-179011

(51) Int. Cl.
| | |
|---|---|
| *C08K 5/05* | (2006.01) |
| *C08K 5/06* | (2006.01) |
| *C09K 3/18* | (2006.01) |
| *C08K 5/01* | (2006.01) |

(52) U.S. Cl.
CPC ... *C08K 5/06* (2013.01); *C08K 5/01* (2013.01); *C08K 5/05* (2013.01); *C09K 3/18* (2013.01)

(58) Field of Classification Search
USPC ....................................... 106/271
See application file for complete search history.

(56) References Cited

U.S. PATENT DOCUMENTS

| | | | | |
|---|---|---|---|---|
| 6,911,494 B2 * | 6/2005 | Yamashita | .......... | C04B 24/2647 524/556 |
| 2007/0173568 A1 * | 7/2007 | Nishikawa | .......... | C04B 24/2647 524/5 |

FOREIGN PATENT DOCUMENTS

| | | |
|---|---|---|
| JP | 8-127761 | 5/1996 |
| JP | 2003-176491 | 6/2003 |
| JP | 2006-182859 | 7/2006 |
| JP | 2006-241409 | 9/2006 |
| JP | 2009-144030 | 7/2009 |
| JP | 2013-87164 | 5/2013 |
| JP | 2013-185018 | 9/2013 |
| WO | WO 03/035809 | 5/2003 |

OTHER PUBLICATIONS http://www.engineeringtoolbox.com/kinematic-viscosity-d_397.html Nov. 3, 2015 4 pages.*

* cited by examiner

*Primary Examiner* — Melvin C Mayes
*Assistant Examiner* — Kenneth Vaden
(74) *Attorney, Agent, or Firm* — Muncy, Geissler, Olds & Lowe, P.C.

(57) ABSTRACT

Provided is an anti-adhesive agent for asphalt mixtures which does not readily separate at ordinary or low temperatures, even after dilution with water. The anti-adhesive agent comprising: a water-soluble monohydric alcohol (A) that has a boiling point greater than or equal to 150° C. and is liquid at 25° C.; a compound (B) that is represented by Formula (1); and liquid paraffin (C) that has a kinematic viscosity of 1 to 40 mm$^2$/s at 40° C., wherein the mass ratios of (A), (B) and (C) are (A) 15 to 35 mass %, (B) 53 to 79 mass % and (C) 6 to 12 mass %. $R^1O\text{-}(EO)_n\text{—}H$ . . . (1) (In the formula, $R^1$ is a hydrocarbon group having a branched alkyl group and having 8 to 12 carbon atoms, EO is an oxyethylene group, and n is the average number of moles of oxyethylene groups added, which is 4 to 10.)

1 Claim, No Drawings

ANTI-ADHESIVE AGENT FOR ASPHALT MIXTURES

BACKGROUND OF THE INVENTION

1. Field of the Invention

The present invention relates to an anti-adhesive agent for asphalt mixtures, which has a strong anti-adhesive effect and a strong release effect on asphalt mixtures, and which does not readily separate at ordinary temperatures or low temperatures, even after dilution with water.

2. Description of Related Art

Asphalt mixtures, which are used for road paving, comprise asphalt, which is an adhesive, and aggregates, which constitute the foundation for the road. The asphalt is heated to a liquid state and mixed with the aggregates, then cooled and solidified, which gives rise to adhesive properties.

It is important to prevent the asphalt mixtures from adhering to devices and equipment, so as to avoid productivity losses in asphalt mixing plants and in road paving sites where the asphalt mixtures are handled. In particular, if the asphalt mixture adheres to the equipment in asphalt mixing plants, such as hoppers, skip conveyors and belt conveyors, the asphalt mixture will gradually build up in places where it adheres, resulting in blockages and the like, which greatly reduce work efficiency.

Consequently, anti-adhesive agents for asphalt mixtures having an anti-adhesive effect and a release effect are necessary in order to prevent adhesion and buildup of the asphalt mixtures on these hoppers, skip conveyors and belt conveyors.

Conventionally, in order to release asphalt mixture that has adhered to hoppers, skip conveyors and belt conveyors, mineral oils such as light oils and heavy oils are regularly dispersed on the hoppers, skip conveyors and belt conveyors from tanks, by way of piping lines.

There have, however, been concerns about methods using light oils and heavy oils, in terms of the impact on the environment due to the outflow of the light oils and heavy oils that are atomized. Thus, there have been numerous reports of anti-adhesive agents for asphalt mixtures with performances equal to or better than those of light oils or heavy oils, which can thus reduce the usage of the same, and which can be used diluted with water.

Patent Literature 1 discloses an emulsion-type anti-adhesive agent for asphalt mixtures, in which animal and vegetable oils and a fatty acid ester of polyoxyethylene sorbitol are diluted and emulsified in water. However, with this anti-adhesive agent, there were problems that large amounts of animal and vegetable oils must be admixed in order to achieve a good result, and after dilution in water, oil/water separation occurs in the tank with the passage of time, which tends to result in a concentration gradient in the tank, such that a stable anti-adhesive effect and release effect cannot be achieved.

As a means for solving the problem of oil/water separation over time, methods have been proposed in which base materials with high affinity for water, and which do not contain oily components, are used; Patent Literature 2 discloses an anti-adhesive agent for asphalt mixtures using a polyhydric alcohol, while Patent Literature 3 discloses an anti-adhesive agent for asphalt mixtures using a polyoxyalkylene glycol derivative.

However, while these anti-adhesive agents had good stability after dilution in water and were capable of producing a stable anti-adhesive effect, their release effect was insufficient, and in particular the performance was not sufficient for use on plant equipment such as hoppers and skip conveyors to which asphalt mixtures readily adhere.

Furthermore, Patent Literature 4 discloses an emulsion type anti-adhesive agent for asphalt mixtures in which a terpene compound serving as an oily component and a non-ionic surfactant or an anionic surfactant are used. However, with this anti-adhesive agent as well, large amounts of the terpene compound are blended in order to achieve a good release effect, while the stability after dilution with water is insufficient, such that it is not possible to arrive at a stable anti-adhesive effect and release effect.

Accordingly, the current situation is that it has not been possible to produce an anti-adhesive agent for asphalt mixtures with which the water-diluted solution does not readily separate, and which exhibits a stable anti-adhesive effect and release effect.

CITATION LIST

Patent Literature

[PTL 1] WO 2003/035809
[PTL 2] Japanese Unexamined Patent Application Publication No. 2006-241409
[PTL 3] Japanese Unexamined Patent Application Publication No. 08-127761
[PTL 4] Japanese Unexamined Patent Application Publication No. 2006-182859

SUMMARY OF THE INVENTION

Technical Problem

The present invention solves the conventional problems described above, an object thereof being that of providing an anti-adhesive agent for asphalt mixtures that has a strong anti-adhesive effect and a strong release effect on asphalt mixtures, and which does not readily separate at ordinary temperatures or low temperatures, even after dilution with water.

Solution to Problem

As a result of earnest investigation directed to solving the problems described above, the present inventors discovered that an anti-adhesive agent for asphalt mixtures, comprising a specific water-soluble monohydric alcohol, a specific polyoxyethylene derivative and liquid paraffin having a specific kinematic viscosity, at specific ratios, has a strong anti-adhesive effect and release effect, and is stably effective, as the water-diluted solution does not readily separate, even at ordinary temperatures or low temperatures, whereby the present invention was completed.

That is to say, the present invention is an anti-adhesive agent for asphalt mixtures comprising: a water-soluble monohydric alcohol (A) that has a boiling point greater than or equal to 150° C. and is liquid at 25° C.; a compound (B) that is represented by Formula (1); and liquid paraffin (C) that has a kinematic viscosity of 1 to 40 mm$^2$/s at 40° C., wherein the mass ratios of (A), (B) and (C) are (A) 15 to 35 mass %, (B) 53 to 79 mass % and (C) 6 to 12 mass %.

$$R^1O\text{-}(EO)_n\text{-}H \tag{1}$$

(In the formula, $R^1$ is a hydrocarbon group having a branched alkyl group and having 8 to 12 carbon atoms, EO is an oxyethylene group, and n is the average number of moles of oxyethylene groups added, which is 4 to 10.)

Advantageous Effects of Invention

The anti-adhesive agent for asphalt mixtures of the present invention has a strong anti-adhesive effect and a strong release effect on asphalt mixtures, and is stably effective, as the anti-adhesive agent does not readily separate at ordinary temperatures or low temperatures, even after dilution with water.

DETAILED DESCRIPTION OF THE PREFERRED EMBODIMENTS

Hereafter, modes of embodiment of the present invention are described. The anti-adhesive agent for asphalt mixtures of the present invention comprises an (A) component, a (B) component and a (C) component. Note that the total of the ratios by mass of the (A) component, (B) component and (C) component is 100 mass %. First, the (A) component will be described.

[(A) Component]

The (A) component used in the present invention is a water-soluble monohydric alcohol that has a boiling point of no less than 150° C., and is liquid at 25° C. The term boiling point, as used herein, refers to the boiling point at atmospheric pressure. Because asphalt mixtures are usually unloaded and worked at temperatures of 110 to 150° C., if the boiling point of the water-soluble monohydric alcohol is less than 150° C., the water-soluble alcohol will vaporize upon contact with the asphalt mixtures, such that it may not be possible to bring about a sufficient anti-adhesive effect and release effect.

The term water-soluble monohydric alcohol refers to a water-soluble compound having one hydroxyl group within the molecule. The term water-soluble as used herein refers to that which dissolves in water, at any ratio, at 25° C.

Especially in terms of the anti-adhesive effect and the release effect, it is preferable that the water-soluble monohydric alcohol (A) has 6 to 8 carbon atoms, and having 6 carbon atoms is more preferable. Furthermore, it is preferable that the water-soluble monohydric alcohol dissolves in water, at any ratio, at 25° C.

Specific examples of the water-soluble monohydric alcohol (A) used in the present invention include ethylene glycol monobutyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, 3-methoxy-1-butanol, 3-methoxy-3-methyl-1-butanol, dipropylene glycol monomethyl ether, dipropylene glycol monoethyl ether, tripropylene glycol monomethyl ether, furfuryl alcohol, tetrahydrofurfuryl alcohol and the like.

In particular, 3-methoxy-3-methyl-1-butanol, dipropylene glycol monomethyl ether, dipropylene glycol monoethyl ether and tripropylen glycol monomethyl ether are preferred because they have excellent anti-adhesive effects and release effects, and 3-methoxy-3-methyl-1-butanol is more preferred.

In the present invention, one type of water-soluble monohydric alcohol (A) may be used alone, or two or more types may be used in combination.

In the present invention, market available products can be used for the water-soluble monohydric alcohol (A) and for example, BUTYLSENOL 30 (made by KH Neochem Co., Ltd.) can be used as a triethylene glycol butyl ether, HIGH-SOLVE DM (made by Toho Chemical Industry Co., Ltd.) can be used as a diethylene glycol monomethyl ether, SOLFIT FINE GRADE (made by Kuraray Co., Ltd.) can be used as a 3-methoxy-3-methyl-1-butanol, and dipropylene glycol monoethyl ether (made by Sigma Aldrich Japan Co., Ltd.) and tetrahydrofurfuryl alcohol (made by Kishida Chemical Co., Ltd.) can be used.

The water-soluble monohydric alcohol (A) constitutes 15 to 35 mass %, and preferably 20 to 30 mass % of the anti-adhesive agent for asphalt mixtures. If this is less than 15 mass %, it may be difficult to produce a good anti-adhesive effect and release effect, and if 35 mass % is exceeded it may be difficult to achieve good stability with the water-diluted solution.

[(B) Component]

The (B) component used in the present invention is a compound represented by the following Formula (1).

$$R^1O\text{-}(EO)_n\text{-}H \qquad (1)$$

In the formula, $R^1$ is a hydrocarbon group having a branched alkyl group and having 8 to 12 carbon atoms, preferably 8 to 10 carbon atoms, and more preferably 10 carbon atoms. At less than 8 carbon atoms, it may be difficult to produce a good release effect and to achieve good stability for the water-diluted solution, and if 12 carbon atoms is exceeded, it may be difficult to achieve good stability for the water-diluted solution. Furthermore, if $R^1$ is a straight chain hydrocarbon, it may be difficult to produce a good release effect, and to achieve good stability for the water-diluted solution at low temperatures.

Examples of hydrocarbon groups having a branched alkyl group and having 8 to 12 carbon atoms include 2-ethylhexyl groups, 3,5-dimethylhexyl groups, 2,2-dimethylhexyl groups, 2-methylheptyl groups, 3-methylheptyl groups, 4-methylheptyl groups, 2-propylpentyl groups, isooctyl groups, 2,2-dimethylheptyl groups, 2,4,4-tetramethylpentyl groups, 3,5,5-trimethylhexyl groups, 2-methyloctyl groups, 2-ethylheptyl groups, 3-methyloctyl groups, isononyl groups, neononyl groups, 2,2-dimethyloctyl groups, 2-methyl-2-ethylheptyl groups, 2-methyl-2-propyhexyl groups, 8-methyl-1-nonyl groups, isodecyl groups, 2-propylheptyl groups, 2-butyloctyl groups and the like. Preferably, this is a 2-ethylhexyl group or an isodecyl group, and more preferably this is an isodecyl group.

EO is an oxyethylene group. n represents the average number of moles of oxyethylene groups (EO) added, which is 4 to 10, and preferably 5 to 7. If n is less than 4, it may be difficult to achieve good stability for the water-diluted solution, and if 10 is exceeded, it may be difficult to produce a good release effect.

The compound (B) represented by Formula (1) can be manufactured by well-known methods, and for example can be produced by adding a predetermined amount of ethylene oxide to a monohydric alcohol having a branched alkyl group and having 8 to 12 carbon atoms.

In the present invention, two or more compounds (B) having different branched alkyl groups or different numbers of carbon atoms can be used. Two or more types of compounds (B) of this sort can, for example, be produced by adding a predetermined amount of ethylene oxide to a mixture of two or more monohydric alcohols having different branched alkyl groups or different numbers of carbon atoms.

The compound (B) constitutes 53 to 79 mass %, and preferably 65 to 70 mass % of the anti-adhesive agent for asphalt mixtures. If this is less than 53 mass %, it may be difficult to achieve good stability for the water-diluted solution, and if 79 mass % is exceeded it may be difficult to produce a good release effect.

[(C) Component]

The (C) component used in the present invention is liquid paraffin having a kinematic viscosity of 1 to 40 mm²/s and preferably a kinematic viscosity of 1 to 10 mm²/s, at 40° C. In the present invention, kinematic viscosity is a value measured on the basis of JIS K-2283.

The term liquid paraffin as used herein indicates highly refined, colorless, transparent, flavorless and odorless hydrocarbon oils, for example hydrocarbon oils having naphthene as a principal component, which are produced by removing impurities such as aromatic hydrocarbon compounds and sulfur compounds contained in lubricating oil distillates of petroleum and highly refining them, or hydrocarbon oils produced by way of polymerization with olefins as starting materials.

One or two or more of these liquid paraffins can be selected for use.

Specific examples of the liquid paraffin (C) include hydrocarbon oils resulting from refining spindle oil distillates by way of sulfuric acid treatment, polyisobutenes and the like, and polyisobutenes are preferred.

The liquid paraffin (C) constitutes 6 to 12 mass %, and preferably 7 to 9 mass % of the anti-adhesive agent for asphalt mixtures. If this is less than 6 mass %, it may be difficult to produce a good release effect, and if 12 mass % is exceeded it may be difficult to achieve good stability for the water-diluted solution.

[Anti-Adhesive Agent for Asphalt Mixtures]

The anti-adhesive agent for asphalt mixtures of the present invention is normally used diluted with water. When using water, the dilution ratio is 3 to 100 times by mass, and preferably 5 to 50 times by mass, with respect to the undiluted solution. However, in some cases, an undiluted solution of the anti-adhesive agent for asphalt mixtures of the present invention may be used.

The anti-adhesive agent for asphalt mixtures of the present invention is primarily used for mixing-plant equipment such as hoppers and skip conveyors, but it may also be used on the load beds of dump trucks, which are used in transport, and on finishers, macadam rollers, tire rollers and the like, which are road paving equipment. The anti-adhesive agent for asphalt mixtures of the present invention is used by way of dispersing it with containers such as PET bottles, or atomizing it with a spray or the like.

The anti-adhesive agent for asphalt mixtures of the present invention may contain additives within a range that does not detract from the effect of the present invention. Examples of such additives include organic or inorganic salts, pH adjusting agents, antibacterial agents, chelating agents, colorants, scents and the like.

WORKING EXAMPLES

The present invention is further described in concrete terms by way of working examples and comparative examples.

Working Examples 1 to 11 and Comparative Examples 1 to 9

Anti-adhesive agents for asphalt mixtures were prepared with the components shown in Table 3 and Table 4, at the mass ratios shown in Table 3 and Table 4. The following tests were performed on the anti-adhesive agents for asphalt mixtures produced. In all of the tests, evaluations of both "⊚" and "○" are considered to be passes.

Note that the physical characteristics and the like of the components A1 to A5 and A'1 to A'5 shown in Table 3 and Table 4 are listed in Table 1 and descriptions, such as notations, for Formula (1) for the components B1 to B5 shown in Table 3 and Table 4, are listed in Table 2.

TABLE 1

| | compound name | boiling point (° C.) | state at 25° C. | solubility in water at 25° C. | number of carbon atoms |
|---|---|---|---|---|---|
| A1 | 3-methoxy-3-methyl-1-butanol | 174 | liquid | dissolves at any ratio | 6 |
| A2 | triethylene glycol monobutyl ether | 265 | liquid | dissolves at any ratio | 10 |
| A3 | diethylene glycol monomethyl ether | 194 | liquid | dissolves at any ratio | 5 |
| A4 | dipropylene glycol monomethyl ether | 198 | liquid | dissolves at any ratio | 7 |
| A5 | tetrahydrofurfuryl alcohol | 178 | liquid | dissolves at any ratio | 5 |
| A'1 | tripropylene glycol monobutyl ether | 274 | liquid | insoluble | 13 |
| A'2 | propylene glycol mono ethyl ether | 132 | liquid | dissolves at any ratio | 5 |
| A'3 | polyoxyethylene (23 mol) monomethyl ether | ≥300 | solid | dissolves at any ratio | 47 |
| A'4 | glycerol | 290 | liquid | dissolves at any ratio | 3 |
| A'5 | polyoxyethylene (20 mol) polyoxypropylene (23 mol) glycol | ≥300 | liquid | dissolves at any ratio | 109 |

TABLE 2

| | $R^1$ | $R^1$ number of carbon atoms | n |
|---|---|---|---|
| B1 | 2-ethylhexyl group | 8 | 4 |
| B2 | isodecyl group | 10 | 6 |
| B3 | 2-ethylhexyl group | 8 | 8 |
| B4 | isodecyl group | 10 | 9 |
| B5 | 2-butyl octyl group | 12 | 10 |

(1) Tests of Anti-Adhesive Effect 10 mL of each of the anti-adhesive agents for asphalt mixtures was measured in a 200 mL beaker, diluted tenfold with 90 mL of water, and stirred for 10 minutes at 25° C. using a stir bar. Then, 50 mL of the diluted solution was placed in a 100 mL screw-top bottle, and a spray nozzle was mounted on the screw-top bottle so that the suction intake reached the bottom of the bottle.

After spraying 1 g of the dilute solution onto 20 cm×15 cm SS400 steel, 1 kg of straight asphalt mixture (a dense-granularity asphalt mixture of 6 mass % straight asphalt and a straight asphalt penetration of 60 to 80; JIS K-2207) heated to 150° C. was placed on the steel, and left for 1 minute at ordinary temperature. Thereafter, the steel was tilted to an angle of 70 degrees, and the straight asphalt mixture was allowed to slide off. This series of operations, which is to say placing 1 kg of straight asphalt mixture on the steel, leaving this for 1 minute at ordinary temperatures, tilting the steel to an angle of 70 degrees and allowing the straight asphalt mixture to slide off, was repeated 10 times.

Subsequently, the amount of straight asphalt mixture that had adhered to the steel plate, and the appearance of the surface of the steel plate were evaluated. The adhesion of asphalt mixtures begins with fine asphalt mixture adhering, and with repeated contact there is a buildup on the asphalt mixture that has adhered, producing large adhering clumps. For this reason, the evaluation was not limited to large adhering clumps of asphalt mixture, but rather, the less that fine asphalt mixture adhered, the better the anti-adhesive agent was evaluated as being. Tests were performed with solutions of the anti-adhesive agent for asphalt mixtures diluted tenfold in water, both immediately after dilution and after having been left for one week at 25° C. Evaluations of the anti-adhesive properties were performed according to the following evaluation standards.

(Evaluation Standards)

◎: The amount adhering is less than 5 g, with substantially no adhesion of asphalt mixture seen on the surface of the steel.

○: The amount adhering is greater than or equal to 5 g and less than 10 g, with large amounts of fine asphalt mixture seen on the surface of the steel.

Δ: The amount adhering is greater than or equal to 10 g and less than 100 g, with large amounts of fine asphalt mixture seen on the surface of the steel, and buildup and clumps formed in places.

x: The amount adhering is greater than or equal to 100 g, with buildup of asphalt mixture seen over the entire surface of the steel.

(2) Tests of Release Effect 0.5 kg of straight asphalt mixture (a dense-granularity asphalt mixture of 6 mass % straight asphalt and a straight asphalt penetration of 60 to 80; JIS K-2207) heated to 150° C. was placed on 20 cm×15 cm of SS400 steel, and left for 10 minutes at ordinary temperature, to produce steel on which a 1 kg of asphalt mixture had adhered.

Furthermore, 100 mL of each of the anti-adhesive agents for asphalt mixtures was measured in a 1000 mL beaker, diluted tenfold with 900 mL of water, and stirred for 10 minutes at 25° C. using a stir bar. Thereafter, the steel on which the asphalt mixture had adhered was immersed in solutions of the anti-adhesive agents for asphalt mixtures immediately after being diluted tenfold with water, and in solutions which had been left for one week at 25° C. after being diluted tenfold with water, so as to completely immerse the asphalt mixture, and this was left for 30 minutes at 70° C. The steel was removed from the solution, the steel was tilted to an angle of 70 degrees, and the straight asphalt mixture was allowed to slide off. The amount of asphalt mixture adhering to the steel was weighed. Evaluations of the release properties were performed according to the following evaluation standards.

(Evaluation Standards)

◎: The amount adhering is less than 2 g.

○: The amount adhering is greater than or equal to 2 g and less than 5 g.

Δ: The amount adhering is greater than or equal to 5 g and less than 10 g.

x: The amount adhering is greater than or equal to 10 g.

(3) Tests of Stability when Diluted in Water 50 mL of tenfold diluted solutions of the anti-adhesive agents for asphalt mixtures prepared in the same manner as for the Test of Anti-Adhesive Effect (1) described above, were placed in 100 mL screw bottles and left for one week, in a thermostatic chamber at −5° C., and in a thermostatic chamber at 25° C., respectively, whereafter the appearances were evaluated on the basis of the following three levels.

(Evaluation Standards)

◎: Uniform and transparent, and no separation seen

○: Slightly cloudy, but no separation seen.

x: Separation seen.

TABLE 3

|  |  | Working Examples | | | | | | | | | | |
|---|---|---|---|---|---|---|---|---|---|---|---|---|
|  |  | 1 | 2 | 3 | 4 | 5 | 6 | 7 | 8 | 9 | 10 | 11 |
| (A) component (mass %) | A1 | 25 | — | — | — | — | 25 | — | 25 | — | — | — |
|  | A2 | — | — | 25 | — | — | — | — | — | — | — | 16 |
|  | A3 | — | — | — | 25 | — | — | 25 | — | — | — | — |
|  | A4 | — | 25 | — | — | — | — | — | — | 25 | — | — |
|  | A5 | — | — | — | — | 25 | — | — | — | — | 33 | — |
| (B) component (mass%) | B1 | — | — | — | — | 67 | 67 | — | — | — | — | — |
|  | B2 | 67 | 67 | 67 | — | — | — | — | — | — | — | — |
|  | B3 | — | — | — | — | — | — | 67 | — | — | — | 78 |
|  | B4 | — | — | — | — | — | — | — | — | — | 60 | — |
|  | B5 | — | — | — | 67 | — | — | — | 67 | 67 | — | — |
| (C) component (mass %) | polyisobutene (40° C. kinematic viscosity: 2.6 min ²/s) | 8 | 8 | 8 | 8 | — | 8 | — | 8 | — | 11 | — |
|  | polyisobutene (40° C. kinematic viscosity: 34.1 min ²/s) | — | — | — | — | 8 | — | 8 | — | 8 | — | 6 |
| evaluation result | (1) anti-adhesive effect immediately after dilution | ◎ | ◎ | ◎ | ○ | ○ | ◎ | ○ | ◎ | ○ | ○ | ○ |
|  | after being left for 1 week | ◎ | ◎ | ◎ | ○ | ○ | ◎ | ○ | ◎ | ○ | ○ | ○ |
|  | (2) release effect immediately after dilution | ◎ | ◎ | ○ | ○ | ○ | ◎ | ○ | ○ | ○ | ○ | ○ |
|  | after being left for 1 week | ◎ | ◎ | ○ | ○ | ○ | ◎ | ○ | ○ | ○ | ○ | ○ |
|  | (3) stability when diluted in water (25° C.) | ◎ | ○ | ◎ | ◎ | ○ | ○ | ◎ | ◎ | ◎ | ○ | ○ |
|  | (3) stability when diluted in water (−5° C.) | ◎ | ○ | ◎ | ◎ | ○ | ○ | ◎ | ◎ | ◎ | ○ | ○ |

TABLE 4

|  |  | Comparative Examples | | | | | | | | |
|---|---|---|---|---|---|---|---|---|---|---|
|  |  | 1 | 2 | 3 | 4 | 5 | 6 | 7 | 8 | 9 |
| (A) component (mass %) | A1 | 25 | — | — | — | — | — | — | — | — |
|  | A2 | — | — | — | — | — | — | 50 | — | — |
|  | A3 | — | — | — | — | — | — | — | — | — |
|  | A4 | — | — | — | — | — | — | — | — | — |
|  | A5 | — | — | — | — | — | — | — | — | — |

TABLE 4-continued

|  |  | Comparative Examples | | | | | | | | |
|---|---|---|---|---|---|---|---|---|---|---|
|  |  | 1 | 2 | 3 | 4 | 5 | 6 | 7 | 8 | 9 |
| (B) component (mass%) | B1 | — | — | — | — | — | — | — | — | — |
|  | B2 | — | 67 | 67 | 67 | — | — | — | — | — |
|  | B3 | — | — | — | — | — | — | — | — | — |
|  | B4 | — | — | — | — | — | — | — | — | — |
|  | B5 | — | — | — | — | — | — | — | — | — |
| (C) component (mass %) | polyisobutene (40° C. kinematic viscosity: 2.6 min ²⁄₈) | 8 | 8 | 8 | 8 | — | — | — | — | — |
|  | polyisobutene (40° C. kinematic viscosity: 34.1 min ²⁄₈) | — | — | — | — | — | — | — | — | — |
| (A') component (mass %) | A'1 | — | 25 | — | — | — | — | — | — | — |
|  | A'2 | — | — | 25 | — | — | — | — | — | — |
|  | A'3 | — | — | — | 25 | — | — | — | — | — |
|  | A'4 | — | — | — | — | — | — | — | 100 | — |
|  | A'5 | — | — | — | — | — | — | — | — | 100 |
| (B') component (mass%) | polyoxyethylene (7 mol) donecyl ether | 67 | — | — | — | — | 67 | — | — | — |
|  | polyoxyethylene (30 mol) sorbitol tetra-octaderenonte | — | — | — | — | 10 | — | — | — | — |
|  | oleic acid diethanolamine salt (molar ratio of oleic acid to diethanolamine is 1:1) | — | — | — | — | — | — | 12 | — | — |
| (C') component (mass %) | soybean oil | — | — | — | — | 80 | — | — | — | — |
|  | palm oil | — | — | — | — | 10 | — | — | — | — |
|  | d-limenene | — | — | — | — | — | 38 | 38 | — | — |
| evaluation result | (1) anti-adhesive effect immediately after dilution | ○ | ○ | Δ | ○ | ○ | ○ | ○ | ○ | ○ |
|  | after being left for 1 week | ○ | Δ | Δ | ○ | Δ | X | Δ | ○ | ○ |
|  | (2) release effect immediately after dilution | Δ | ○ | ⊚ | Δ | ⊚ | ⊚ | ⊚ | X | X |
|  | after being left for 1 week | Δ | Δ | ⊚ | Δ | Δ | X | Δ | X | X |
|  | (3) stability when diluted in water (25° C.) | ○ | X | ⊚ | ○ | X | X | X | ⊚ | ○ |
|  | (3) stability when diluted in water (−5° C.) | X | X | ⊚ | ○ | X | X | X | ⊚ | ○ |

The anti-adhesive agents for asphalt mixtures in Working Examples 1 to 11 according to the present invention contained the water-soluble monohydric alcohol (A), the compound (B) represented by Formula (1) and the liquid paraffin (C), and therefore had strong anti-adhesive effects and release effects on asphalt mixtures, and the water-diluted solutions were stable, without readily separating, at ordinary temperatures or low temperatures.

Meanwhile, the anti-adhesive agent (Comparative Example 1) containing polyoxyethylene mol) dodecyl ether (B'1 component) instead of the (B) component did not have a good release effect or good water-diluted stability at −5° C.

The anti-adhesive agent (Comparative Example 2) containing, in place of the (A) component, tripropylene glycol monobutyl ether (A'1 component) as the monohydric alcohol, which has a boiling point that is greater or equal to 150° C., and which is liquid at 25° C., but which does not dissolve in water at 25° C., did not produce a good anti-adhesive effect and release effect, and did not achieve good stability for the water-diluted solution, after being left for one week.

The anti-adhesive agent (Comparative Example 3) containing, in place of the (A) component, polypropylene glycol monoethyl ether (A'2 component), as a monohydric alcohol that is liquid and soluble in water at 25° C., but which is a compound with a boiling point of less than 150° C., did not produce a good anti-adhesive effect.

The anti-adhesive agent (Comparative Example 4) containing, in place of the (A) component, a polyoxyethylene (23 mol) monomethyl ether (A'3 component), as a water-soluble monohydric alcohol, which has a boiling point that is greater or equal to 150° C., but which is not a liquid at 25° C., did not produce a good release effect.

The anti-adhesive agent (Comparative Example 5) containing soybean oil, palm oil and polyoxyethylene (30 mol) sorbitol tetra-octadecenoate, the anti-adhesive agent (Comparative Example 6) containing d-limonene and polyoxyethylene (7 mol) dodecyl ether, and the anti-adhesive agent (Comparative Example 7) containing the triethylene glycol monobutyl ether that is the (A) component, d-limonene and oleic acid diethanolamine salt, all had good anti-adhesive effects and release effects immediately after dilution, but separated after being left for one week, and were not able to produce good effects. Furthermore, the water dissolved-stabilities were not good.

The anti-adhesive agent (Comparative Example 8) containing glycerol (A'4 component), which is a polyalcohol, had good water-diluted stability, but did not produce good effects in terms of the release effect.

The anti-adhesive agent (Comparative Example 9) containing polyoxyethylene (20 mol) polyoxypropylene (23 mol) glycol (A'5 component) had a good anti-adhesive effect immediately after dilution, the water-diluted stability was good, and the anti-adhesive effect was good after being left for one week, but it did not produce a good effect in terms of the release effect.

What is claimed is:

1. An anti-adhesive agent for asphalt mixtures comprising: a water-soluble monohydric alcohol (A) that has a boiling point greater than or equal to 150° C. and is liquid at 25° C.; a compound (B) that is represented by Formula (1); and liquid paraffin (C) that has a kinematic viscosity of 1 to 40 mm²/s at 40° C., wherein the mass ratios of (A), (B) and (C) are (A) 15 to 35 mass %, (B) 53 to 79 mass % and (C) 6 to 12 mass %;

$$R^1O-(EO)_n-H \quad (1),$$

wherein $R^1$ is a hydrocarbon group having a branched alkyl group and having 8 to 12 carbon atoms, EO is an oxyethylene group, and n is the average number of moles of oxyethylene groups added, which is 4 to 10.

* * * * *